Patented June 23, 1931

1,811,663

UNITED STATES PATENT OFFICE

NEWTON C. BOYD, OF KENVIL, NEW JERSEY, ASSIGNOR TO HERCULES POWDER COMPANY, OF WILMINGTON, DELAWARE, A CORPORATION OF DELAWARE

METHOD OF PRODUCING EXPLOSIVES

No Drawing.   Application filed April 12, 1928.   Serial No. 269,613.

My invention relates to an improved method for producing explosives and more particularly relates to an improved method for producing an explosive including a nitroglycerine-nitrosugar solution.

Heretofore it has been suggested, (Comey's U. S. Patent No. 1,301,105), that a solution of sugar in glycerine be subjected to nitration for the production of an explosive and such has been accomplished, for example, by dissolving 20 parts of cane sugar and 80 parts of glycerin and subjecting 15 parts of the resultant solution to nitration with 100 parts of mixed acid composed, for example, of 62% $H_2SO_4$ and 38% $HNO_3$, the nitrated product being separated from the spent acid and stirred until neutral with, for example, a 0.6% solution of sodium carbonate in water at a temperature of about 70° F.–100° F., after which the alkali solution is drawn off and the nitrated product washed with pure water.

In the practice of the method above outlined, it has been found impractical to utilize more than 20% of sugar, since no more than 20% of sugar can be dissolved in glycerin and it has been found that the product produced is relatively unstable requiring the use of substantial quantities of a stabilizer, as for example, diphenylamine. Further, in the carrying out of the method above outlined relatively complicated and expensive apparatus is required in connection with the production and storage of the glycerin-sugar solution and its transfer to the nitrator and which involves substantial maintenance cost due to the deposit of sugar passing out of solution.

Now, in accordance with my invention, I provide a method for the production of a nitrated glycerin-sugar explosive whereby the proportion of sugar may be increased up to about 70% without loss of sugar from precipitation and whereby a nitrated glycerin-sugar solution having greatly increased stability, greater resistance to the development of acidity with aging and increased efficiency is produced. Further, the method in accordance with my invention enables the elimination of a substantial portion of the apparatus heretofore necessary to the production of glycerin-sugar explosives.

From the broad standpoint, the process in accordance with my invention involves first the nitration of the desired quantity of glycerin with subsequent addition to the nitrated glycerin and partly spent acid of the desired quantity of sugar. If desired, less than the desired quantity of glycerin may be nitrated and after the nitration of the sugar further glycerin may be added to make up the desired quantity.

More specifically, in carrying out the method in accordance with my invention a quantity of glycerin in amount equal approximately to one-half of the total quantity of glycerin to be used, is subjected to nitration by treatment in the usual nitrator with a nitrating mixture composed of mixed sulphuric and nitric acid. Before completion of the addition of the glycerin to the nitrating mixture the cooling of the nitrator should be so regulated as to permit the temperature of the nitrated glycerine and mixed acids to rise to about 55° F. during completion of the nitration of the glycerine. When the glycerine is nitrated the sugar, say amounting to 25%, is shaken directly into the nitrator in such manner, preferably, that it will not strike the paddles or sides of the nitrator before entering the nitrating mixture. The sugar will enter the nitrating acids without fuming and will cause only slight rise in temperature, which may be controlled by intermittent cooling of the nitrator. The sugar is preferably added slowly, for example, at a rate at which a like amount of glycerin would be added, and is nitrated and goes into solution in the nitrated glycerine. After addition of the sugar to the nitrator stirring is continued for about five minutes and then if, as is preferably the case, all the glycerin intended to be contained in the finished product was not nitrated initially the mixture is cooled to about 45° F. and the balance of the glycerin added slowly, the temperature being slowly dropped to about 36° F.–38° F., by regulation of the cooling.

When the nitration is completed the nitrated glycerin-sugar solution is separated from the spent acid, washed with water and subjected to a suitable alkali wash.

The product resultant from my improved process will be found to have substantially greater stability than heretofore and with a substantially decreased development of acidity with ageing as compared with similar products produced by prior methods. If desired, the product may be further stabilized by the addition of any well known stabilizer, as for example, diphenylamine.

The process in accordance with my invention possesses great advantage over prior processes for the production of nitrated glycerin-sugar, especially in that while only about 20% of sugar may be dissolved in glycerin prior to nitration, about 70% sugar may be dissolved in nitroglycerin in the form of nitrated sugar where the sugar, as in accordance with my invention, is added directly to the nitrator after nitration of the glycerin, since nitroglycerin is a substantially better solvent for nitrated sugar than glycerin is for sugar and since the conditions, as regards the strength of the nitrating mixture, are more favorable for nitration of the sugar than when, as in prior processes, the sugar is first dissolved in the glycerin and the solution nitrated. Further, the process in accordance with my invention enables a known weight of sugar to be provided in the product, since loss of sugar, as by crystallization in storage tanks or pipe lines, from the sugar-glycerin solution is avoided.

The process in accordance with my invention enables substantial economy in plant cost and operation, since it is unnecessary to provide and operate apparatus for the production of a preliminary sugar-glycerin solution and storage tanks and piping for the solution are eliminated.

It will be understood that in accordance with my invention, I contemplate the use in place of glycerin of equivalents therefor, as glycols, polymerized glycols, polymerized glycerin or mixtures thereof with one another or with glycerin, and where in the claims appended hereto glycerin is specified, it is intended to include equivalents therefor. I also contemplate the use in place of cane sugar of other sugars, as glucose, mannose, xylose.

Having now fully described my invention, what I claim and desire to protect by Letters Patent is:

1. The method of producing an explosive which includes effecting the nitration of a quantity of glycerin in the presence of a nitrating mixture and then adding a quantity of sugar to the nitrated glycerin while still in the presence of the nitrating mixture, and effecting nitration of the sugar and solution of the nitrated sugar in the nitrated glycerin.

2. The method of producing an explosive which includes effecting the nitration of a quantity of glycerin in the presence of a nitrating mixture, then adding a quantity of sugar to the nitrated glycerin while still in the presence of the nitrating mixture, effecting nitration of the sugar and solution of the nitrated sugar in the nitrated glycerin, then adding a further quantity of glycerin to the nitrated glycerin-nitrated sugar solution and effecting nitration thereof.

3. The method of producing an explosive which includes effecting the nitration of a quantity of glycerin in the presence of a nitrating mixture, regulating the temperature of the nitrated glycerin and nitrating mixture to a temperature of about 55° F., adding a quantity of sugar to the nitrated glycerin and nitrating mixture, and effecting nitration of the sugar and solution of the nitrated sugar in the nitrated glycerin while maintaining the temperature thereof at about 55° F.

4. The method of producing an explosive which includes effecting the nitration of a quantity of glycerin in the presence of a nitrating mixture, regulating the temperature of the nitrated glycerin and nitrating mixture to a temperature of about 55° F., adding a quantity of sugar to the nitrated glycerin and nitrating mixture and effecting nitration of the sugar and solution of the nitrated sugar in the nitrated glycerin while maintaining the temperature thereof at about 55° F., regulating the temperature of the solution formed and of the nitrating mixture to a temperature of about 45° F. and adding a further quantity of glycerin thereto while gradually reducing the temperature thereof to a temperature of about 36° F.–38° F.

In testimony of which invention, I have hereunto set my hand, at Kenvil, N. J., on this 3rd day of April, 1928.

NEWTON C. BOYD.